(No Model.)
L. C. REED.
PLOW.
No. 324,415. Patented Aug. 18, 1885.
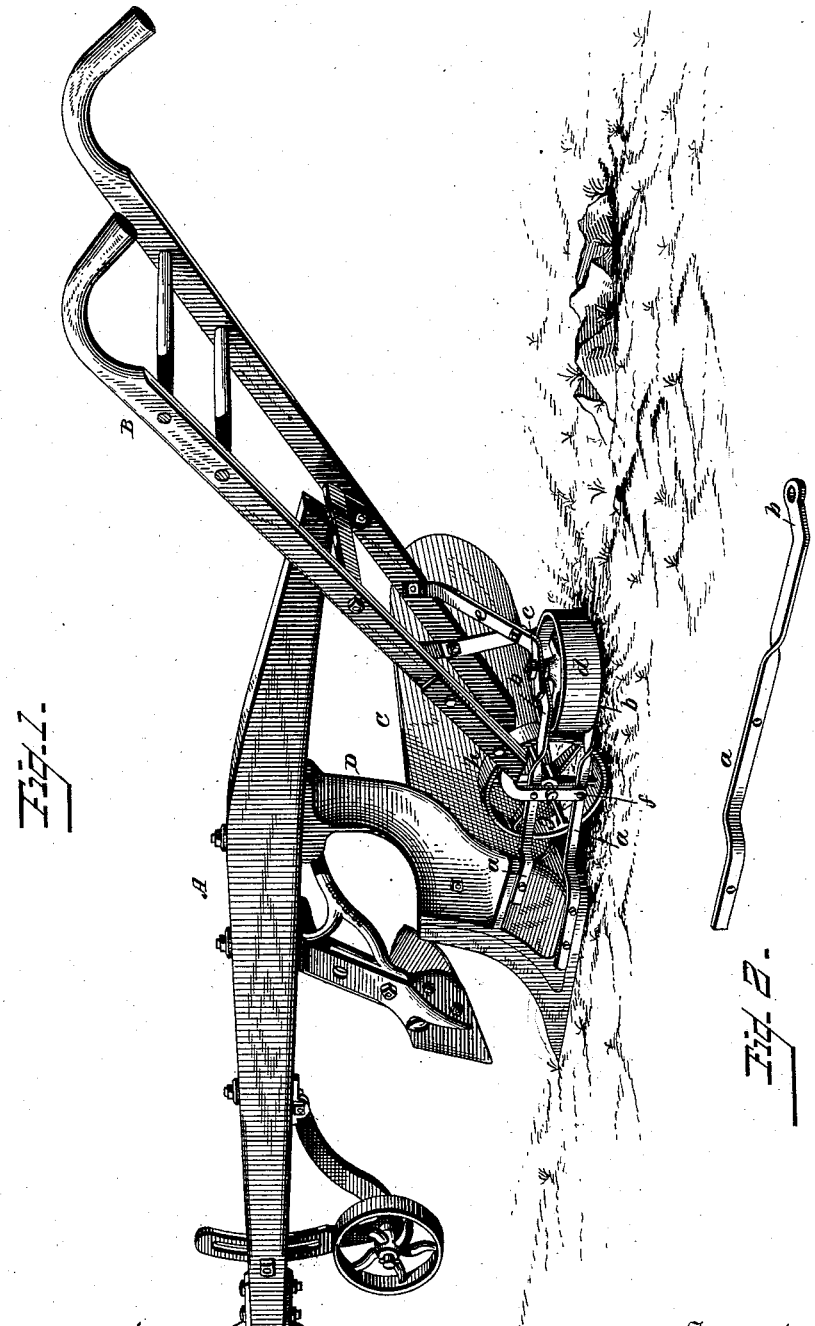

UNITED STATES PATENT OFFICE.

LEWIS C. REED, OF GIRARD, MICHIGAN.

PLOW.

SPECIFICATION forming part of Letters Patent No. 324,415, dated August 18, 1885.

Application filed May 7, 1885. (No model.)

*To all whom it may concern:*

Be it known that I, LEWIS C. REED, a citizen of the United States, residing at Girard, in the county of Branch and State of Michigan, have invented certain new and useful Improvements in Plows; and I do hereby declare the following to be a full, clear, and exact description of the invention, such as will enable others skilled in the art to which it appertains to make and use the same.

This invention has relation to improvements in plows; and it consists in the novel construction and arrangement of a horizontal wheel applied in rear of the mold-board and serves as a landside to the plow; and the invention also consists in various combinations of parts, as will be hereinafter fully explained, and particularly pointed out in the appended claim.

The annexed drawings, to which reference is made, fully illustrate my invention, in which Figure 1 represents a perspective view of a plow showing my device; and Fig. 2 is a perspective view of one of the bars $a$ detached from the plow.

Referring by letter to the accompanying drawings, A designates the plow and B the handles, C the mold-board, and D the standard.

To the rear of the standard is secured two parallel bars, $a$ $a$, which are provided with the off-sets $b$ $b$, which are designed to throw the bars $a$ $a$ toward the mold-board. The rear ends of the bars are perforated to receive a vertical bolt $c$, on which is arranged a horizontal wheel, $d$, the periphery of which is in line with the outside face of the plow-standard, and serves as the landside of the plow. This wheel is braced to the handles by the inclined bar $e$, and is firmly secured in position. These parallel bars are firmly connected to one another near their middle by a vertical bar, $f$, which has a bearing, as at $g$, for the journal of the furrow-wheel $h$.

It will be seen that I dispense with the common landside, and by the construction shown the horizontal wheel serves all purposes therefor and relieves the plow from friction, as is the case with the ordinary landside.

Having described my invention, what I claim, and desire to secure by Letters Patent, is—

The combination, with the plow-standard, of the parallel bars $a$ $a$, having the off-sets $b$ $b$, and provided with the horizontal wheel $d$, arranged and operating as shown and described.

In testimony whereof I affix my signature in presence of two witnesses.

LEWIS C. REED.

Witnesses:
C. W. PARKS,
J. C. LEONARD.